United States Patent [19]

Heist

[11] 4,340,972
[45] Jul. 20, 1982

[54] TRANSMITTER/RECEIVER TEACHING APPARATUS

[75] Inventor: Kenneth D. Heist, Billings, Mont.

[73] Assignee: Sporteach, Inc., Helena, Mont.

[21] Appl. No.: 64,572

[22] Filed: Aug. 7, 1979

[51] Int. Cl.³ .............................................. H04B 1/034
[52] U.S. Cl. ........................................ 455/39; 455/89;
455/95; 455/100; 455/116; 455/351; 434/253; 434/433
[58] Field of Search ....................... 455/39, 66, 89, 90,
455/95, 100, 116, 351; 35/29 R, 29 A, 29 B, 29 C, 29 D, 29 F, 10.21, 14

[56] References Cited

U.S. PATENT DOCUMENTS

| | | | |
|---|---|---|---|
| 3,003,136 | 10/1961 | Burnett | 455/89 |
| 3,492,582 | 1/1970 | Heywood | 455/39 |
| 3,846,704 | 11/1974 | Bessette | 455/100 |
| 3,889,190 | 6/1975 | Palmer | 455/89 |
| 3,916,312 | 10/1975 | Campbell | 455/89 |
| 3,983,483 | 9/1976 | Pando | 455/89 |
| 4,119,797 | 10/1978 | Wollert | 455/116 |

*Primary Examiner*—Marc E. Bookbinder
*Assistant Examiner*—Tommy P. Chin
*Attorney, Agent, or Firm*—Arthur L. Urban

[57] ABSTRACT

A teaching apparatus including a transmitter portion, a receiver portion and a prompter portion, each of the portions being disposed in a separate self-contained unit, the transmitter portion being adapted to be worn on the head and including a peripheral band portion and a top connecting portion extending in an arcuate path between opposing sides of the peripheral band, a microphone disposed on the under side of the connecting portion intermediate the ends thereof for contact with the head, an antenna associated with the peripheral band portion, citizen's band transmitter mechanism located on the connecting portion, power supply member connected to the transmitter member, voice activatible actuating member connected to the transmitter member; the receiver portion being adapted to be worn on the head and including a peripheral band portion, transducer member disposed on the inside of the peripheral band portion, citizen's band receiver member connected to the transducer member, power supply member connected to the receiver member, the prompter portion including citizen's band transmitter member, message producing mechanism connected to the transmitter member, power supply mechanism connected to the transmitter member and an antenna connected to the transmitter member.

7 Claims, 7 Drawing Figures

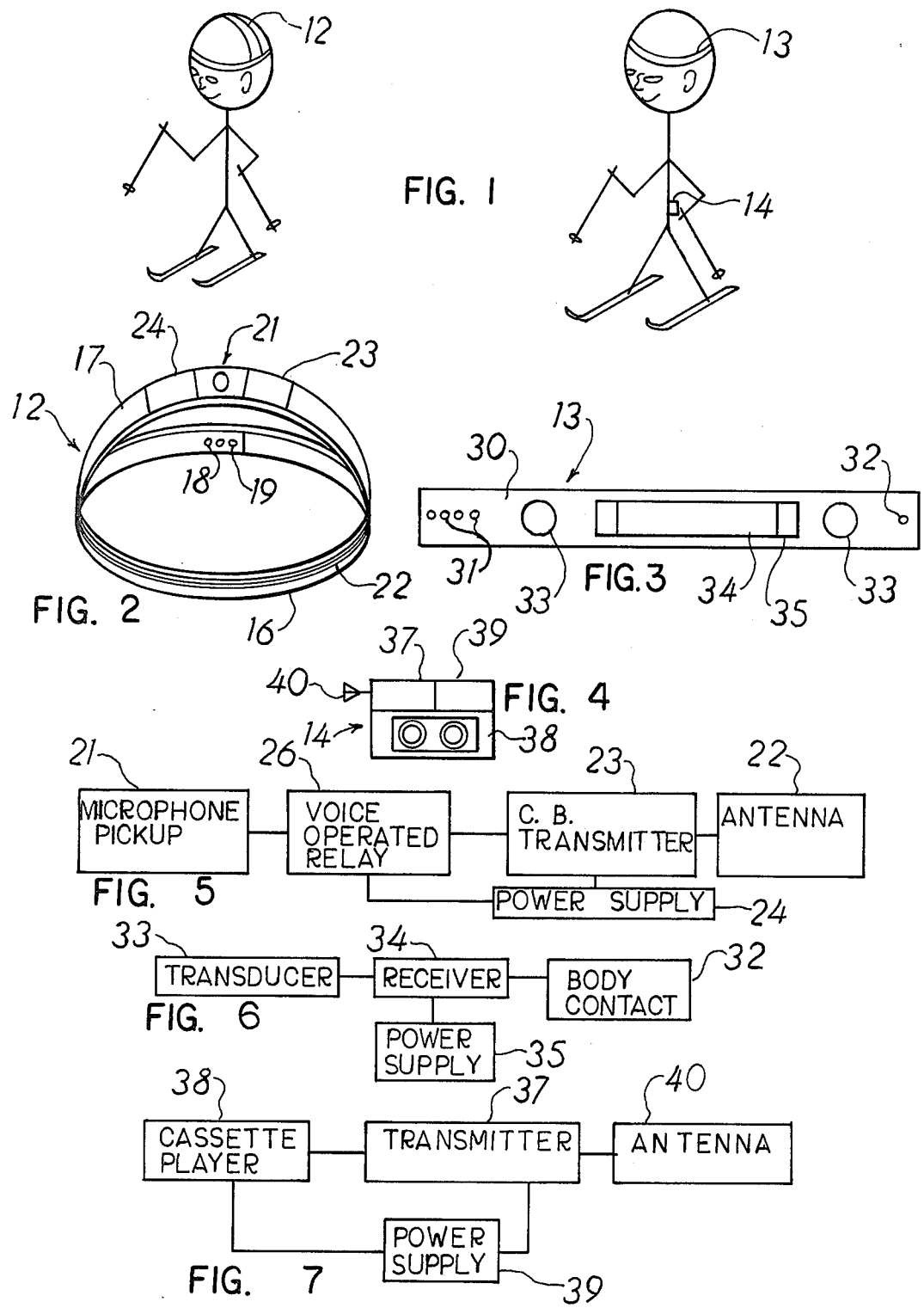

TRANSMITTER/RECEIVER TEACHING APPARATUS

This invention relates to a novel teaching apparatus and more particularly relates to a new apparatus for instructing students when the teacher and pupil are at some distance from one another.

In the teaching of pupils, one of the important considerations is ensuring good communication between the teacher and pupil. In most situations, the teacher and pupil are in relatively close proximity to each other and are in quiet surroundings so simple verbal communication is satisfactory. Even if the distance between the teacher and pupil is substantial, amplification of the teacher's voice through a public address system generally is satisfactory.

However, in some situations conventional systems do not provide acceptable communication. For example, where the instruction is taking place in noisy surroundings, it often is very difficult for the pupil to understand what the teacher is saying. The use of transmitters and receivers frequently provides the desired or required communication between the teacher and the pupil under such conditions.

One of the problems previously encountered in the use of transmitters and receivers was the restrictions and limitations in their use. Generally, these resulted from the design and construction of the various components of the communication system. Many of the components were of considerable size and weight.

Size and weight of the transmitter and receiver may not be a drawback under conditions in which the teacher and pupil remain at a single location. In such situations, the transmitter and/or receiver can be positioned on a table or other surface adjacent to the teacher and pupil respectively.

Difficulties arise however, when the teacher and pupil move about during the instruction. A variety of transmitters and receivers were proposed in attempts to provide greater mobility for the teacher and pupil. In the past, some of the mobile equipment was designed to be carried in a back pack. With the advent of solid state electronics, the size of the equipment could be reduced significantly. Some solid state electronic devices are small enough that they can be carried in a pocket or shoulder bag. Others can be strapped around the waist of an individual or an arm or leg.

Even though the size of the transmitter or receiver is greatly reduced through the use of solid state electronics, problems still arise with the accessories which are required in their use, such as the earphones, microphones and antennae. Some systems utilize earphone receivers. This arrangement is useful when it is desirable to screen out extraneous noises. However, when it is essential that the user hear surrounding sounds it is a drawback. Other systems utilize a single small earphone, but this requries a wire from the earphone to the receiver.

Another problem is the microphone. A few of the communication systems employ throat mikes although most systems utilize a small mike which is positioned near the mouth on a rigid support which runs around the head to the ear or another transmitter location.

A further design limitation is the location of the antenna. With some systems, the antenna extends upwardly from the earphones while in others a wire is strapped to a portion of the user's body.

From the above discussion, it is apparent that communication systems currently available have a number of drawbacks in their design. Depending upon the mobility and activity of the user, some drawbacks are not serious. However, with other activities which require a great deal of mobility, e.g., skiing, current systems may be unacceptable. Although communication systems and teaching systems have been proposed for skiing and similar activities, the unsuitability of such systems is evidenced by the lack of significant acceptance of the systems.

The present invention provides a novel teaching apparatus with features and advantages not available with current systems. The teaching apparatus of the invention provides a minimum of restriction and limitation on the activities of the users. The teaching apparatus, thus, is suitable for use with activities which involve a great deal of mobility such as skiing and the like. Furthermore, the teaching apparatus does not affect the middle ear of the user and thus does not affect the equilibrium of the user. In addition, the teaching apparatus of the invention does not require the use of a separate microphone, earphone, or antenna. The teaching apparatus provides unitized receiver and transmitter devices. A further advantage of the apparatus is it does not require sterilization before use by a different individual.

The teaching apparatus of the present invention is simple in design and can be fabricated from commercially available components and materials. The design of the teaching apparatus of the invention enables it to be used simply and conveniently. The apparatus can be set up for use with a minimum of instruction. The user does not have to adjust the volume or change channels. Also, the apparatus provides a high degree of flexibility in use, both for individuals and groups. Another feature of the teaching apparatus of the invention is that teacher instruction and self instruction can be coordinated conveniently.

Other benefits and advantages of the novel teaching apparatus of the invention will be apparent from the following description and the accompanying drawings in which:

FIG. 1 is a schematic illustration of one form of the novel teaching apparatus of the invention in use;

FIG. 2 is an enlarged view in perspective of the transmitter portion of the teaching apparatus shown in FIG. 1;

FIG. 3 is an enlarged side view of the receiver portion of the teaching apparatus shown in FIG. 1 in an open position;

FIG. 4 is an enlarged side view of the prompter portion of the teaching apparatus shown in FIG. 1;

FIG. 5 is a block diagram illustrating one form of circuitry of the transmitter portion of the teaching apparatus shown in FIG. 1;

FIG. 6 is a block diagram illustrating one form of the circuitry of the receiver portion of the teaching apparatus shown in FIG. 1; and FIG. 7 is a block diagram illustrating one form of the circuitry of the prompter portion of the teaching apparatus shown in FIG. 1.

As shown in the drawings, one form of the novel teaching apparatus of the invention includes a transmitter portion 12, a receiver portion 13 and a prompter portion 14. Each of the above-named portions 12, 13 and 14 is disposed in a separate self-contained unit.

The transmitter portion 12 is adapted to be worn on the head of the user as shown. The transmitter portion 12 includes a peripheral band portion 16 and a top connecting portion 17 which extends in an arcuate path between opposing sides of the peripheral band. Advantageously, the peripheral band portion 16 includes means for adjusting the size of the band to fit the head. This may take the form of separating ends as shown with fastening means such as openings 18 and screws or similar fasteners 19 which connect the openings of one end of the band with the other. Alternatively, the ends of the band may be connected by suitable snaps.

A microphone 21 is disposed on the under side of the top connecting portion 17, that is, the side of the top connecting portion which is in contact with the head. Microphone 21 which is modified for pickup of vibrations in the audio range is disposed intermediate the ends of the connecting portion 17, preferably near the middle thereof so the microphone will make contact with the top of the head.

An antenna 22 is associated with the peripheral band portion 16. Advantageously, the antenna 22 is a dipole antenna which is attached to the outer surface of the peripheral band portion. Alternatively, the peripheral band portion 16 may consist of more than one layer with the antenna 22 disposed between the layers.

The transmitter means shown as transmitter circuit board 23 is located on the connecting portion 17. The transmitter circuit such as the three transistor CB transceiver circuit built in the transmit position by L. Solomon in *Citizen Band Equipment Design Electronics*, 33:45, pages 70-72; also shown on pages 793 of the *Source Book of Electronic Circuits* published by McGraw-Hill, 1967. The transmitter board 23 and the microphone 21 are connected to a power supply means shown as rechargeable battery 24.

The transmitter portion 12 further includes voice activitable actuating means connected to the transmitter 23. The voice activatable actuating means includes a voice operated relay 26 as shown in the block diagram of FIG. 5 which illustrates one form of circuitry of the transmitter portion 12. Microphone pickup 21 is connected to voice operated relay 26 which switches transmitter 23 to an energized state. Transmitter 23 in turn is connected with antenna 22. Power supply 24 is connected to transmitter 23 as well as relay 26.

In the operation of the transmitter portion 12 of the teaching apparatus of the invention, the peripheral band portion 16 is adjusted for size and placed on the head of the user with the top connecting portion 17 extending over the top of the head and in contact therewith. The transmitter then is ready for use by the instructor. The instructor actuates the transmitter simply by speaking. His voice is picked up by microphone 21 and carried to voice actuated relay 26 which activates the transmitter circuit 23. The signals from the transmitter circuit 23 are sent out by antenna 22 located in the band portion 16 of the transmitter portion 12.

The receiver portion 13 also is adapted to be worn on the head of the user. The receiver portion 13 includes a peripheral band portion 30 which preferably includes means for adjusting the size of the band to fit the head. This is shown in the drawings as a band with separating ends with suitable fastening means such as openings 31 and fasteners 32 which engage therewith.

The receiver portion 13 includes transducer means shown as a pair of transducers 33 disposed on the inside of the band portion 30. Receiver means 34 is connected to the transducers 33. The receiver means is a conventional citizen's band receiving unit. An example of a suitable receiver section is shown on page 224 of *Signetics Analog Application Manual* published by Signetics Corporation in 1979. A suitable audio section is shown in the *National Semiconductor* 1978 *Linear Databook*, LM 386, page 10-47. Power supply means shown as rechargeable battery 35 is connected to the receiver unit 34.

FIG. 6 illustrates a block diagram of one form of circuitry for the receiver portion 13. As shown, hearing transducers 33 are connected to receiver 34 which is energized by power supply 35. Receiver 34 is connected to fastener 32 which functions as a contact with the user's body so that the body will serve as an antenna for the receiving unit.

In the operation of the receiver Portion 13 of the teaching apparatus of the invention, the peripheral band portion 30 is adjusted for size and placed on the head of the user with the transducers 33 on the inside in contact with the head surface. Advantageously, the fastener 32 which secures the ends of the peripheral band together includes a conductive section adapted for contact with the head. The fastener in turn is connected with the receiving unit 34 so that the body of the user will serve as an antenna through contact with fastener 32. Signals are received by receiving unit 34 which then transmits audio to transducers 33. Since transducers 33 are in contact with the head of the user, the radio is transmitted to the skull through bone conduction transmission and heard by the student.

Prompter portion 14 includes transmitter means 37 and message producing means shown as a miniature cassette player 38 which is connected to the transmitter. A power supply 39 shown as a rechargeable battery and an antenna 40 also are connected to the transmitter 37. Preferably, the power supply means 39, the cassette player 38 and the transmitter 37 of the prompter portion 14 all are located in a unitary structure. A suitable circuit for the transmitter 38 is a low power broadcast band transmitter (adapted to 455 KC) from page 386 of the *General Electric Transistor Manual*, Seventh Edition, 1964.

FIG. 7 shows a block diagram of one form of circuitry for prompter portion 14. Cassette player 38 is connected to transmitter 37 and an antenna 40 is also connected to the transmitter 37. A power supply 39 energizes transmitter 37 and cassette player 38.

In the operation of the prompter portion 14, a cassette 41 is placed into player 38 and the prompter actuated so that the message on the cassette is transmitted by transmitter 37 through antenna 40 to receiver portion 13.

Operation of the teaching apparatus of the invention as shown in the drawings is accomplished by coordinating the three portions of the apparatus, namely, the transmitter portion 12, the receiver portion 13 and the prompter portion 14. For example, a ski instructor places the transmitter portion 12 on his head with the microphone on the connecting portion 17 thereof in contact with the top of his head. A student places the receiver portion 13 on his head with the peripheral band 30 thereof positioned so that the transducers 33 are in contact with the head. The student also places the prompter portion 14 in a pocket of his parka. The ski instructor can give instructions to the student simply by speaking which activates the circuitry of his transmitter as described above. In turn, the student receives the instruction from his receiver. If desired, the student can play a cassette on the prompter portion 14. With the teaching apparatus of the instruction, the instructor can add his verbal comments to those of the recorded messge or preferably the prompter may be used for instruction after a lesson.

The above description and the accompanying drawings show that the present invention provides a novel teaching apparatus with features and advantages not available with current communication systems. The teaching apparatus of the invention is suitable for use with activities which involve considerable mobility such as skiing and the like. The teaching apparatus does not require a separate microphone, earphone or antenna. Furthermore, a teaching apparatus of the invention is especially suitable for use in sports and similar activities since it does not affect the middle ear of the user and thus the equilibrium.

The teaching apparatus of the invention is simple in design and provides unitized transmitter and receiver devices. Moreover, the design enables the apparatus to be used simply and conveniently. Sterilization of components is not required before use by different individuals. Also, the user does not have to adjust the volume or change channels. The teaching apparatus of the invention is suitable for use in individual or group instruction. Also, the teaching apparatus can be used conveniently to coordinate teacher instruction with previously recorded instruction.

It will be apparent that various modifications can be made in the particular form of the teaching apparatus described in detail above and shown in the drawings within the scope of the invention. For example, different transmitter and/or receiver circuit boards may be substituted for those shown. Also, the size and configuration of the transmitter, receiver and prompter components may be changed to meet specific requirements. Therefore the scope of the invention is to be limited only by the following claims:

What is claimed is:

1. Teaching apparatus including a transmitter unit, a receiver unit and a prompter unit, each of said units being disposed in a separate self-contained unit, said transmitter unit being adapted to be worn on a head of a first individual and including a first peripheral band portion and a top connecting portion extending in an arcuate path between opposing sides of said first peripheral band, a microphone disposed on the under side of said connecting portion intermediate the ends thereof for contact with the head, an antenna associated with said first peripheral band portion, first citizen's band transmitter means located on said connecting portion, first power supply means connected to said first transmitter means, voice activatible actuating means connected to said first transmitter means; said receiver unit being adapted to be worn on a head of a second individual and including a second peripheral band portion, transducer means disposed on the inside of said second peripheral band portion, citizen's band receiver means connected to said transducer means, second power supply means connected to said receiver means, said prompter unit being adapted to be worn by said second individual including second citizen's band transmitter means, message producing means connected to said second transmitter means, third power supply means connected to said second transmitter means and an antenna connected to said second transmitter means.

2. Teaching apparatus according to claim 1 including means for adjusting the size of the first and second peripheral head band portions of said transmitter unit and said receiver unit.

3. Teaching apparatus according to claim 2 wherein said size adjusting means of said second peripheral head band portion of said receiver unit includes a conductive section adapted for contact with said head of said second individual.

4. Teaching apparatus according to claim 1 wherein said voice activatible actuating means of said transmitter unit includes a relay.

5. Teaching apparatus according to claim 1 wherein said first power supply means and said voice activatable actuating means are located on said top connecting portion of said transmitter unit.

6. Teaching apparatus according to claim 1 wherein said receiver means and said second power supply means are located on said second peripheral band portion of said receiver unit.

7. Teaching apparatus according to claim 1 wherein said third power supply means, said message producing means and said second transmitter means of said prompter unit are located in a separate unitary structure.

* * * * *